(12) United States Patent
Bak et al.

(10) Patent No.: US 11,055,359 B2
(45) Date of Patent: Jul. 6, 2021

(54) HIERARCHICAL OBJECTS LINKAGE DATA VISUALIZATION

(71) Applicant: International Business Machines Corporation, Armonk, NY (US)

(72) Inventors: Peter Bak, Yokneam Ilit (IL); Ofer Haim Biller, Neve Boker (IL); Rotem Blinder, Tel Aviv (IL); Tal Daniel, Dimona (IL); Adir Even, Tel Aviv (IL); Oded Sofer, Midreshet Ben Gurion (IL); Mazal Yakoobov, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 15/972,241

(22) Filed: May 7, 2018

(65) Prior Publication Data

US 2019/0340304 A1 Nov. 7, 2019

(51) Int. Cl.
*G06F 16/904* (2019.01)
*G06T 11/20* (2006.01)
*G06F 16/901* (2019.01)

(52) U.S. Cl.
CPC ........ *G06F 16/904* (2019.01); *G06F 16/9024* (2019.01); *G06F 16/9027* (2019.01); *G06T 11/206* (2013.01)

(58) Field of Classification Search
None
See application file for complete search history.

(56) References Cited

U.S. PATENT DOCUMENTS

| | | | |
|---|---|---|---|
| 8,185,824 B1* | 5/2012 | Mitchell | H04L 41/044 715/734 |
| 8,650,492 B1* | 2/2014 | Mui | H04L 43/0829 715/736 |
| 8,732,101 B1* | 5/2014 | Wilson | G06F 16/9535 706/15 |
| 9,021,361 B1* | 4/2015 | Pettinati | G06Q 30/00 715/736 |
| 9,703,845 B2 | 7/2017 | Iesiev et al. | |
| 9,922,436 B2* | 3/2018 | Iannaccone | G06F 3/0485 |
| 10,586,362 B2* | 3/2020 | Lee | G06F 3/0482 |
| 10,776,350 B1* | 9/2020 | Porath | G06F 3/04845 |
| 10,853,383 B2* | 12/2020 | Agnew | G06F 16/248 |

(Continued)

*Primary Examiner* — Richard L Bowen
(74) *Attorney, Agent, or Firm* — Ziv Glazberg

(57) ABSTRACT

A computer-implemented method, computerized apparatus and computer program product for hierarchical objects linkage data visualization. A visualization of linkage data comprising a plurality of connections between a set of source objects and a set of target objects is obtained with respect to a predetermined level of hierarchy defined over attributes of at least one of the sets, wherein attributes of the objects and connections therebetween are represented in the visualization as nodes and links of a bipartite graph respectively. A spatial layout of links of a node is modified based on a relative position of each neighbor node thereof in an adjacent level, wherein neighboring nodes represent attributes of one or more objects which share in common an attribute represented by the node, wherein the relative position is determined based on a visualization restricted to the neighboring nodes so as to obtain a position preserving layout.

19 Claims, 9 Drawing Sheets

(56) References Cited

U.S. PATENT DOCUMENTS

| | | | |
|---|---|---|---|
| 10,861,202 B1* | 12/2020 | Agnew | G06F 16/9535 |
| 2004/0024755 A1* | 2/2004 | Rickard | G06F 16/951 |
| 2005/0288836 A1* | 12/2005 | Glass | G09B 29/106 |
| | | | 382/293 |
| 2013/0031142 A1 | 1/2013 | Waster | |
| 2013/0227412 A1* | 8/2013 | Ornstein | G06F 3/04847 |
| | | | 715/711 |
| 2015/0040185 A1 | 2/2015 | Faitelson et al. | |
| 2015/0081701 A1* | 3/2015 | Lerios | H04L 43/045 |
| | | | 707/736 |
| 2017/0039576 A1* | 2/2017 | Gauthier | G06Q 30/0201 |
| 2018/0284955 A1* | 10/2018 | Canavor | G06F 16/29 |

* cited by examiner

HIERARCHICAL OBJECTS LINKAGE DATA VISUALIZATION

TECHNICAL FIELD

The present disclosure relates to data visualization in general, and to visualization of data relating to hierarchical objects and links thereamong, in particular.

BACKGROUND

Computer based visualization systems provide visual representations of datasets designed to help people carry out tasks more effectively. Data visualization could be considered as a process in which data are taken as input and visual representations are generated as output. Visualization tool are employed by users to explore or display large datasets, and enable them to detect patterns and trends within the information presented, as well as its change over time. At its best, data visualization is an expert storyteller. There are many ways to create a visual encoding of data as a single picture. The output s can be displayed with colors, shapes and figures in a way so that users could easily understand and quickly grasp the insight of the data. The range of possibilities yet expands further when users are granted with options to manipulate one or more of these pictures with interaction.

One approach to interactive visualization tools design is known as the "Visual Information Seeking Mantra". The Mantra, "Overview first, zoom and filter, then details-on demand", describes how data should be presented on screen so that it is most effective for users. Overview provides a general context for understanding the dataset; it paints a "picture" of the whole data entity that the information visualization represents. Helpful patterns and themes in the data can often be seen only from such viewpoint. The goal may then be to locate significant features for further examination. Zooming and filtering both involve reducing the complexity of the data representation by removing distracting information from view and allowing for further data organization that can help completing tasks more efficiently. Zooming can be regarded as filtering by navigation and change of representational vantage point. Zooming facilitates two different cognitive tasks, depending on whether it is zooming-in or zooming-out. In the case of zooming-in, it removes extraneous information from the visual field, allowing higher abilities of information processing into meaningful patterns for interpretation and decision-making based thereon. In the case of zooming-out, it reveals hidden information. This allows a user to rediscover her location within the information space, so that crucial information from other datasets shall not to be overlooked. Lastly, in details-on-demand phase, additional information is provided on a point-by-point basis, without requiring a change of view. This can be useful for relating the detailed information to the rest of the data set, or for quickly effecting particular tasks, such as identifying a specific data element amongst many or relating attributes of data. Providing these details by a simple action, the "on-demand" feature allows this information to be revealed without changing the context in which the data have been originally situated.

Another approach to designing and evaluation of data visualization systems is the nested model, which splits visualization design into four levels, with distinct evaluation methodologies suggested at each level, based on the validity concerns that occur at that level. The nested model is set in a high-level framework that deals with the following three questions: what can be visualized, why a visualization tool is being used, and how a visualization idiom can be constructed out of a set of design choices. In more detail, the "what" question relates to what data the user can see, i.e. which abstract types can be visualized. The four-basic dataset are: tables, networks, fields and geometry. Other possible collections of items include clusters, sets and lists. The datasets can be made up of different combinations of five data types: items, attributes (categorical or ordered), links, position and grids. The type of an attribute can be categorical or ordered (ordinal or quantitative). The ordering direction of attributes can be sequential, diverging, or cycling. The "why" question relates to the reason for which the user intends to use a visualization tool, i.e. actions and targets to be achieved. The highest-level actions to use visualization are to consume (discover, present and enjoy) or produce (annotate, record and derive) information. The middle level is to search, whether the identity and location of targets are known or not. At the low-level, queries refer to targets. Targets for all kinds of data are finding trends and outliers. The queries have three scopes: identify one target, compare some targets, and summarize all targets. For multiple attributes, the target can be determining dependencies, correlation, or similarities between them. The "how" question relates to the manner in which the visual interaction idioms are constructed in terms of design choices. These choices are categorized into four groups: data encoding, which includes how data are arranged spatially, i.e. using express value, separate, ordered or aligned view, as well as how data are mapped with non-spatial visual channels including size, color, angle, shape and the like; data manipulation, by which a user can change any aspect of the view, select elements from within the view and navigate to change the view point within the view; data faceting, which includes how to juxtapose and coordinate multiple views, how to partition data between views and how to superimpose layers on top of each other; and, data reduction, which includes options to filter data away, aggregate many data elements together and embed focus and context information together within a single view.

In the nested model, the four levels are: domain situation; operation and data type abstraction; visual encoding and interaction design; and, algorithm design. The first, top level is to characterize the problems and data of a particular domain. At this first level, the emphasis is on learning about the tasks and data of target users in some particular target domain. Each domain usually has its own vocabulary for describing its data and problems, and there is usually some existing workflow of how the data are used to solve problems faced by those users. The second level is to map problems and data from the vocabulary of the specific domain into a more abstract and general description that is in the vocabulary of computer science. The output of this level is a description of operations and data types, which are the input required for making visual encoding decisions at the next level. The other aspect of this stage is to transform the raw data into the data types that visualization techniques can address: a table of numbers where the columns contain quantitative, ordered, or categorical data; a node-link graph or tree; a field of values at every point in space; and the like. The goal is to find the right data type so that a visual representation thereof addresses the problem, which often requires transformation of the raw data into a derived type of a different form. The third level is to design the visual encoding and interaction to support those operations, and the innermost fourth level is to create an algorithm to carry out that design automatically and efficiently. The three inner levels are all instances of design problems, although a different one at each level.

BRIEF SUMMARY

One exemplary embodiment of the disclosed subject matter is a computer-implemented method comprising: obtaining a visualization of linkage data using a visualization tool, the linkage data comprising a plurality of connections between objects, wherein an object at a first endpoint of a connection is a source object and an object at a second endpoint of the connection is a target object, whereby a set of source objects and a set of target objects are defined, wherein the visualization tool is configured for rendering linkage data as a bipartite graph which nodes thereof are positioned relative to one another in a manner optimizing a spatial layout of links of the graph representing the plurality of connections, wherein objects in at least one of the set of source objects and the set of target objects are associated with a set of attributes having a hierarchical ordering from a top-most level to a bottom-most level, wherein the visualization is rendered by applying the visualization tool with respect to a predetermined level of the set of attributes; and, for at least one node in the visualization and a subset of one or more objects sharing in common an attribute represented by the at least one node, modifying a spatial layout of links connected to the at least one node based on a relative position assigned to each node representing an attribute in an adjacent level of the predetermined level by the visualization tool when applied with respect to the subset and attributes thereof in the adjacent level.

Optionally, nodes by which attributes are represented are rendered along parallel axes, wherein each level is assigned a single axis.

Optionally, each link is rendered with a width indicative of an amount transferred between nodes connected thereby.

Optionally, the hierarchical ordering of the set of attributes is arranged in a tree-like structure, and wherein said modifying is performed iteratively by traversing the tree-like structure from a root node downwards to descendant nodes until all leaf nodes are reached, wherein all links of a traversed node are modified based on the relative positions assigned to descendant nodes of the traversed node by the visualization tool when being applied with respect to the descendant nodes.

Optionally, the visualization tool is a Sankey diagram plotting tool.

Optionally, said modifying is performed selectively and reversibly in response to user demand, whereby allowing the user to examine the linkage data in a drill-down fashion.

Optionally, said modifying is performed for one or more respective subsets of objects with a common attribute in the predetermined level and/or for one or more successive levels each of which being designated in turn as the predetermined level, wherein results of said modifying are stored in a designated storage means for fast-retrieval upon user demand.

Another exemplary embodiment of the disclosed subject matter is a computerized apparatus having a processor and coupled memory, the processor being adapted to perform the steps of: obtaining a visualization of linkage data using a visualization tool, the linkage data comprising a plurality of connections between objects, wherein an object at a first endpoint of a connection is a source object and an object at a second endpoint of the connection is a target object, whereby a set of source objects and a set of target objects are defined, wherein the visualization tool is configured for rendering linkage data as a bipartite graph which nodes thereof are positioned relative to one another in a manner optimizing a spatial layout of links of the graph representing the plurality of connections, wherein objects in at least one of the set of source objects and the set of target objects are associated with a set of attributes having a hierarchical ordering from a top-most level to a bottom-most level, wherein the visualization is rendered by applying the visualization tool with respect to a predetermined level of the set of attributes; and, for at least one node in the visualization and a subset of one or more objects sharing in common an attribute represented by the at least one node, modifying a spatial layout of links connected to the at least one node based on a relative position assigned to each node representing an attribute in an adjacent level of the predetermined level by the visualization tool when applied with respect to the subset and attributes thereof in the adjacent level.

Yet another exemplary embodiment of the disclosed subject matter is a computer program product comprising a non-transitory computer readable storage medium retaining program instructions, which program instructions when read by a processor, cause the processor to perform a method comprising: obtaining a visualization of linkage data using a visualization tool, the linkage data comprising a plurality of connections between objects, wherein an object at a first endpoint of a connection is a source object and an object at a second endpoint of the connection is a target object, whereby a set of source objects and a set of target objects are defined, wherein the visualization tool is configured for rendering linkage data as a bipartite graph which nodes thereof are positioned relative to one another in a manner optimizing a spatial layout of links of the graph representing the plurality of connections, wherein objects in at least one of the set of source objects and the set of target objects are associated with a set of attributes having a hierarchical ordering from a top-most level to a bottom-most level, wherein the visualization is rendered by applying the visualization tool with respect to a predetermined level of the set of attributes; and, for at least one node in the visualization and a subset of one or more objects sharing in common an attribute represented by the at least one node, modifying a spatial layout of links connected to the at least one node based on a relative position assigned to each node representing an attribute in an adjacent level of the predetermined level by the visualization tool when applied with respect to the subset and attributes thereof in the adjacent level.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
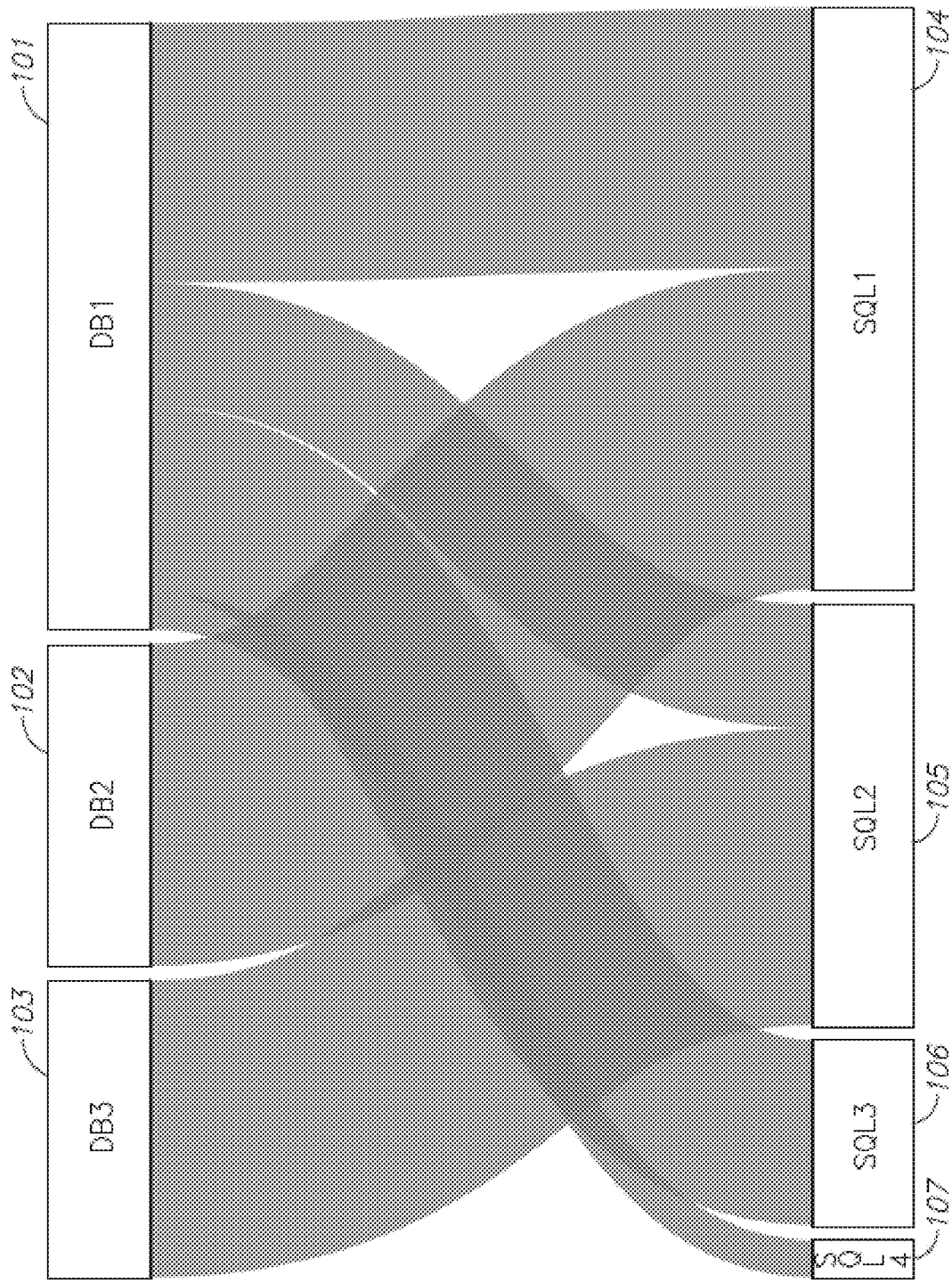
FIGS. 1A-1G show an illustrative exemplary visualization of hierarchical objects linkage data and successive layout modifications thereof, in accordance with some exemplary embodiments of the disclosed subject matter.

One technical problem dealt with by the disclosed subject matter is to provide visualization of relations between sets of objects that communicates information to a user in a meaningful way. One visualization tool used for depicting a flow from one set of values to another is the Sankey diagram. The Sankey diagram illustrates entities and connections between them as a bipartite graph, wherein the connected entities are represented by nodes of the graph and the connections are represented as edges of the graph, i.e. links between nodes. The links may have varying widths, wherein the width of a link may indicate its size or cardinality, such as, for example, a number of repeated instances of a same type of interaction between a pair of entities in question, an amount of flow, or the like. Sankey diagram tools are typically configured to arrange the nodes in an ordering considered optimal for visualization, such that the length of each link and number of crossings are minimal.

Sankey diagrams may be suitable when a requirement arises for illustrating a many-to-many mapping between two domains or multiple paths through a set of stages. Sanky diagrams may allow to select a specific category, i.e. a specific node or group of nodes, and observe highlighted flows associated therewith. By highlighting the major transfers or flows within a system, Sankey diagrams can be helpful in locating dominant contributions to an overall flow. Often, Sankey diagrams show conserved quantities within defined system boundaries. The Sankey diagram tool may be useful for relating different data dimensions next to each other, rather than focusing on a leading dimension, for example. The Sankey diagram can illustrate detailed relationships between two layers, such that a user can explore flows between each pair of adjacent layers at a time. However, conventional Sankey diagram tools pose a difficulty in tracking flows between non-successive layers. For example, in a Sankey diagram comprising a first, second and third layer, while a portion of a flow from a source group in the first layer to a target group in the third layer may be present in a diagram section of ingoing and outgoing flows of the second layer, the overall amount transferred cannot be readily discerned. Furthermore, as Sankey diagram tools are not bound to a position preserving layout, rendering each pair of layers separately and overlaying the resulting charts together may likely be futile for such purpose, as the ordering of the nodes may not be consistent among the different layers and context may thus be lost in a combination attempt. This may also be the case, for example, where the different layers conform to a set of attributes of the visualized objects, which attributes have a hierarchical structure, e.g. a tree-like structure.

One technical solution is to obtain a visualization performed for a predetermined layer in a hierarchical set of attributes of linked entities, and modify a spatial layout of visualized links connecting to a node representing an attribute in the predetermined layer, based on relative positions of nodes representing related attributes in an adjacent layer, in accordance with the hierarchy relation. In some exemplary embodiments, the various attributes of the linked entities may be rendered along parallel axes, wherein each level of attributes may be assigned a single axis. The attributes may have a tree-like structured hierarchy, wherein a root of the tree conforms to the highest or top-most level and descendent nodes conform to lower levels. A visualization tool, such as a Sankey diagram plotting tool or the like, may be applied with respect to the top-most level, i.e. on root nodes. The positioning of links of each parent node may be overridden by a relative position of each descendant node thereof. Entities at one endpoint of a link may be referred to as source objects, and their linked counterparts at the other endpoint may be referred to as target objects. The re-positioning of links may be performed for either the source objects, the target objects, or both. Additionally or alternatively, the re-positioning may be performed iteratively, wherein tree-like structures of attributes of the linked entities may be traversed from a root node downwards to descendant nodes and until leaf nodes are reached, wherein for each parent node the links connected thereto may be modified based on relative positions assigned by the visualization tool to descendant nodes thereof. In some exemplary embodiments, the different views of the visualized data after each modification of the links may be stored in a fast-retrieval data structure, such as a hash table or the like, and may be displayed per user demand. Additionally or alternatively, the modification may be performed in a selective and reversible manner responsive to user demand. For example, a user may be able to examine the visualized data in a drill-down fashion, by selecting a number of attribute levels to be displayed, adding or removing nodes representing attributes of lower levels, e.g. for a particular node or a group of nodes, and the like. The user may be further provided for this purpose with an ability to manually interact with the visualization and to navigate up and down through the hierarchy of either one of the set of source objects, the set of target objects, or both.

One technical effect of utilizing the disclosed subject matter is to allow visualization of links between hierarchical objects in a single unified view while maintaining parameters of a spatial layout thereof close to optimal. The visualization may present both a hierarchical structure of the objects as well as an indication of transferred amounts between the source and target sets in any level of interest in a position preserving layout, such that an overall context may be maintained when moving from one level to another or switching between views of more or less detailing.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIGS. 1A-1G showing an illustrative exemplary visualization of hierarchical objects linkage data and successive layout modifications thereof, in accordance with some exemplary embodiments of the disclosed subject matter.

FIGS. 1A-1G demonstrate visualization of data relating to database access by users. The source objects are database users, wherein attributes in the first and top-most level correspond to database names, and attributes in the second, lower level correspond to user names. The target objects are database entries, wherein attributes in the first level correspond to table names, and attributes in the second level correspond to field names. It will be appreciated that while in FIGS. 1A-1G the levels of the target objects are shown with the first level being at the bottom and the second level being above it, the reversal of order is merely for display purposes and the first level is still considered top-most, the second lower than it, and so forth.

FIG. 1A shows a Sankey diagram plotted for attributes in a first, top-most level of each of the source and target objects. Attributes of the source objects are represented by Nodes 101, 102 and 103, and attributes of the target objects are represented by Nodes 104, 105, 106 and 107. Nodes 101, 102 and 103 of the source objects all lie on one axis, and Nodes 104, 105, 106 and 107 of the target objects all lie on another axis parallel thereto. As shown in FIG. 1A, links are present between Node 101 and Nodes 104, 105, 106 and 107, as well as between Node 102 and Node 104, and between Node 103 and Node 105. The links indicate that users of database DB1 accessed all tables SQL1, SQL2, SQL3 and SQL4, while users of database DB2 only accessed table SQL1, and users of database DB3 only accessed table SQL2. The width of the links indicates a number of times a same type of access was made. For example, as shown in FIG. 1A, the number of accesses from database DB1 to table SQL4 is about half of the number of accesses from database DB1 to table SQL2, which, in turn, is about half of the number of accesses from database DB1 to table SQL1.

Figure 1B:
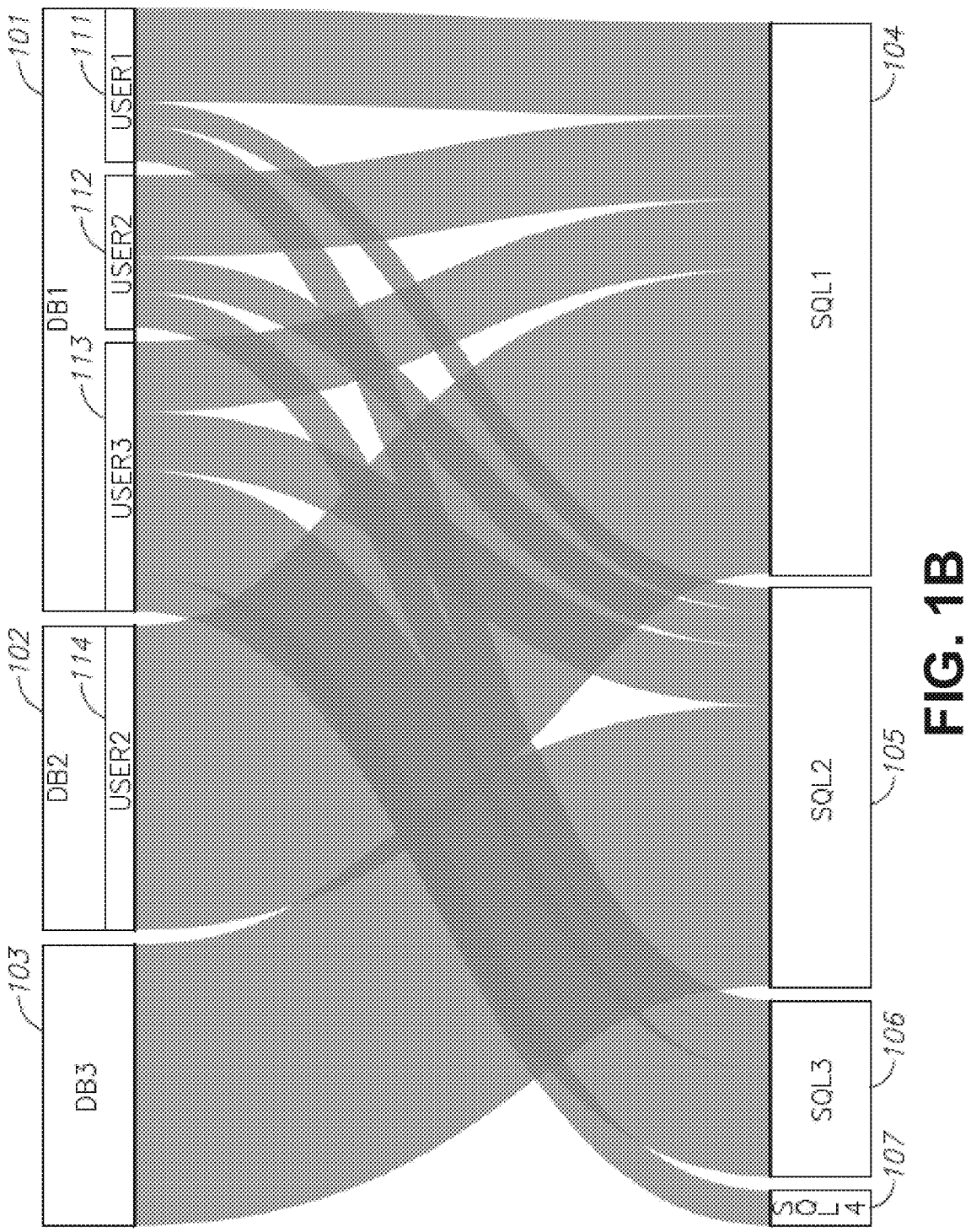

FIG. 1B shows a first layout modification wherein links connected to Node 101 are modified based on positioning of Nodes 111, 112, and 113 which are descendants of Node 101, in accordance with a hierarchical ordering over attributes of the source objects. Node 111 corresponds to a user name USER1, Node 112 corresponds to a user name USER2, and Node 113 corresponds to a user name USER3, all with respect to accesses made from database DB1. As shown in FIG. 1B, with respect to the user name USER1, for example, most accesses performed from database DB1 are to table SQL1, with relatively fewer accesses to tables SQL2 and SQL3, and none to table SQL4. Similarly, with respect to user name USER2, most accesses from database DB1 are to table SQL1, and the remainder accesses, which are of a lesser amount, are to tables SQL2 and SQL3, while for user name USER3, most accesses from database DB1 are to table SQL3, and others are to tables SQL1, SQL2 and SQL4, with a slight advantage in number to the first two. As FIG. 1B further shows, in case of a node with only a single descendant in an adjacent lower level of the attribute hierarchy, such as Node 114 which is a sole descendant of Node 102, the spatial layout of the links of the parent Node 102 and links of the descendant Node 114 may be substantially the same.

Figure 1C:
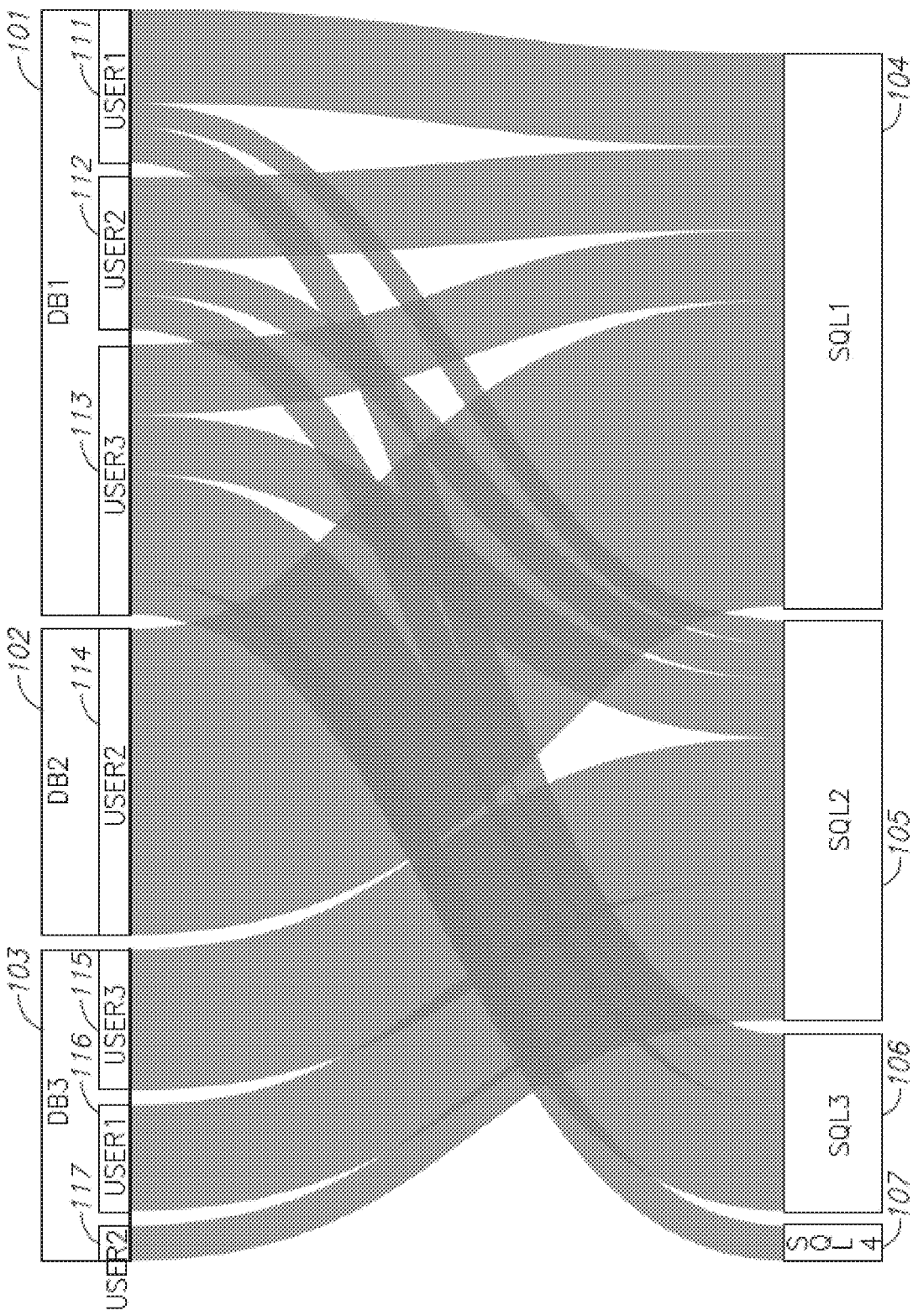

FIG. 1C shows a second layout modification wherein links of Node 103 are overridden by links of its descendants, Nodes 115, 116 and 117. As shown in FIG. 1C, in this case all links remain converged at the endpoint of Node 105, but are discerned among the different user names USER1, USER2 and USER3. In addition, as is also shown in FIG. 1C, the relative positions of Nodes 115, 116 and 117, which represent user names USER3, USER1 and USER2, respectively, are determined so as to optimize the visualization, rather than by a sequential ordering, such as a numerical or alphabetical order, for example.

Figure 1D:
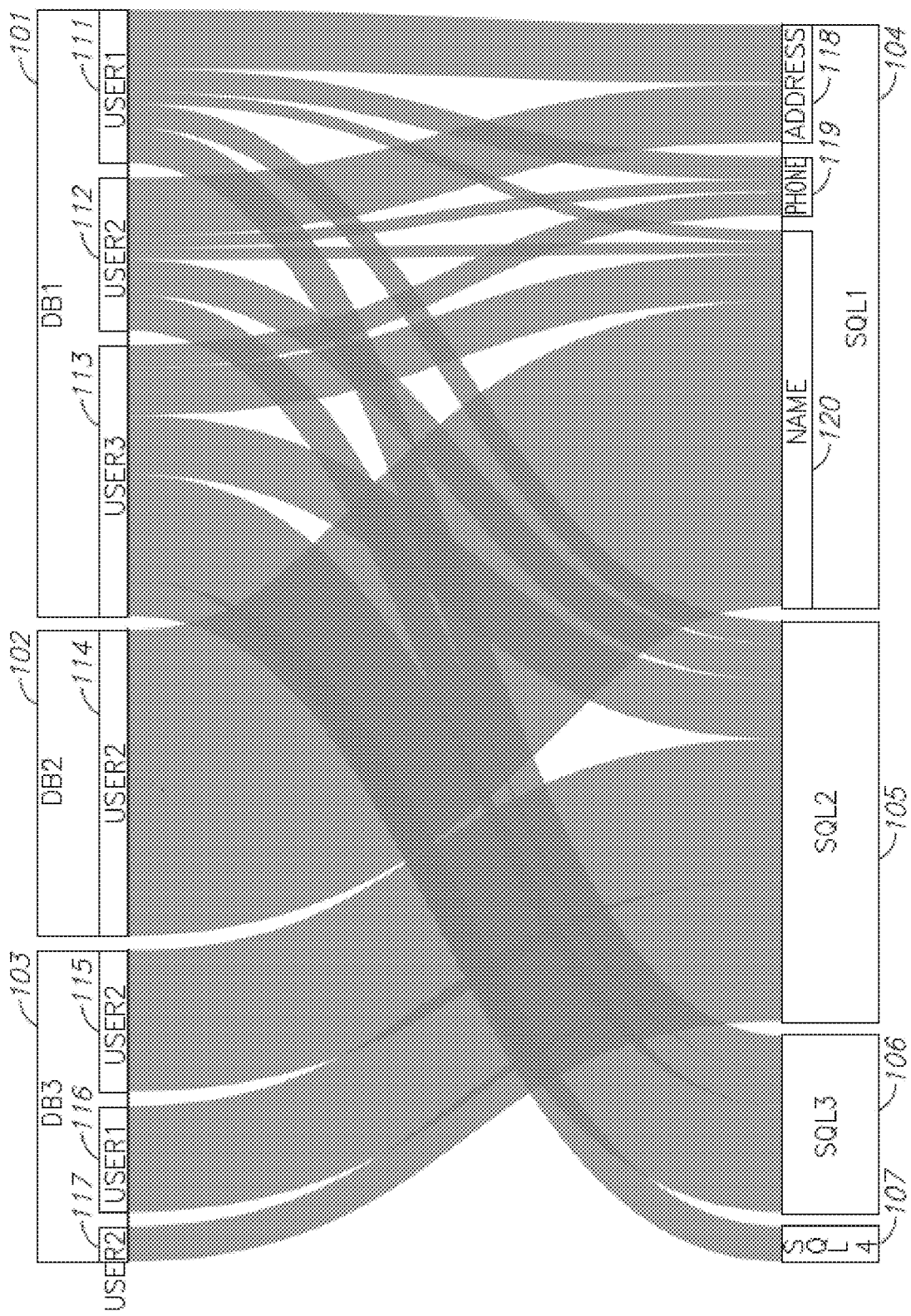

FIG. 1D shows a third layout modification wherein links of Node 104 are repositioned in accordance with relative positions and corresponding links of its descendants, Nodes 118, 119 and 120, representing the field names attributes of table SQL1, namely, ADDRESS, PHONE and NAME, respectively. As shown in FIG. 1D, the modification entails, among other things, a splitting of a single link, formerly connecting Node 111 and Node 104 together, into three separate links connecting Node 111 to the newly added descendants of Node 104, namely, Nodes 118, 119 and 120. It will be appreciated that the positioning and layout optimization may be performed in a manner which in any event preserves the ordering of the visualized links, as demonstrated by comparison of any successive pair of figures from the FIGS. 1A-1G.

Figure 1E:
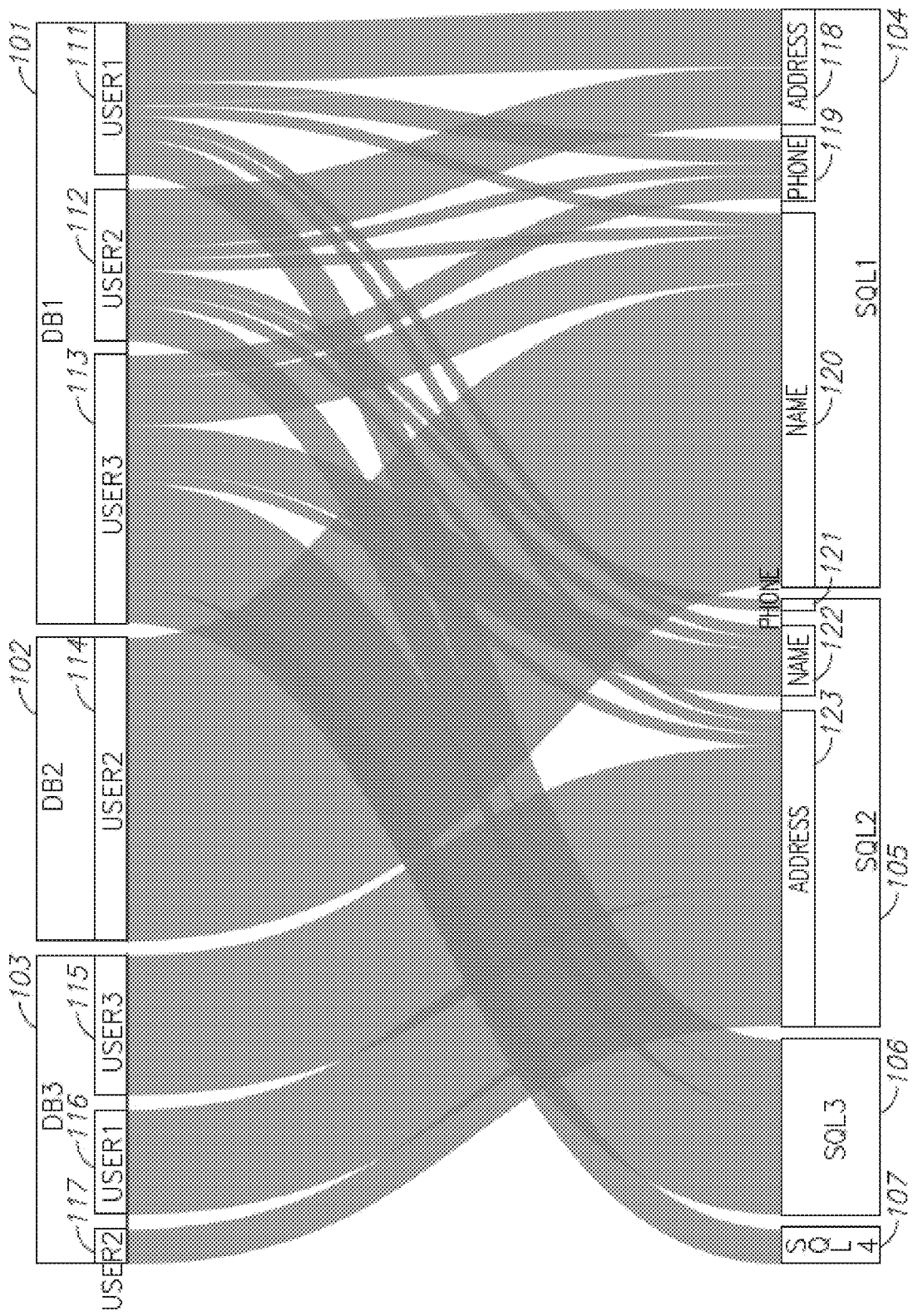

FIG. 1E shows a fourth layout modification wherein links of Node 105 are modified based on positions of descendants Nodes 121, 122 and 123, representing the second level attributes PHONE, NAME and ADDRESS of table SQL2, respectively.

Figure 1F:
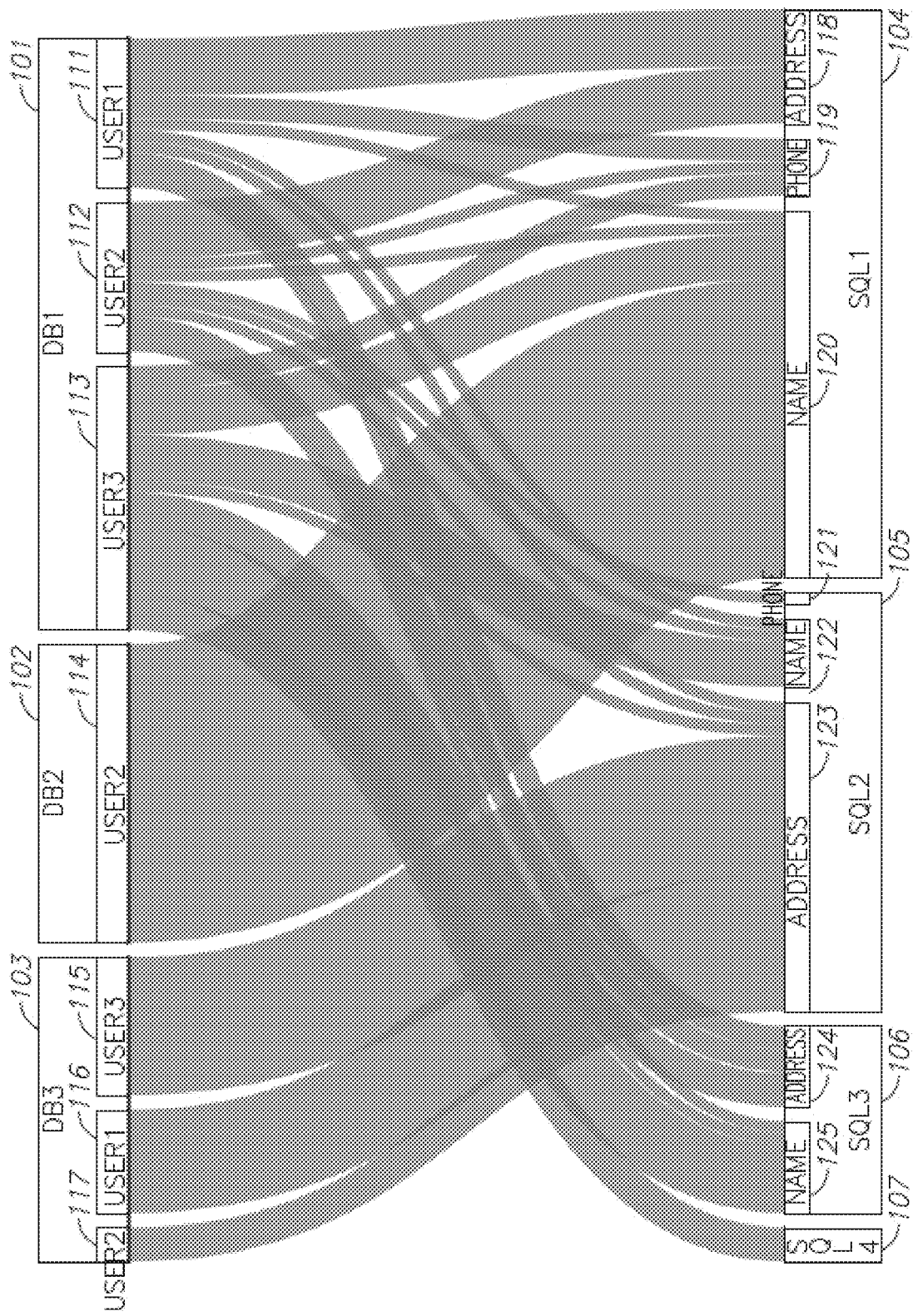

FIG. 1F shows a fifth layout modification wherein links of Node 106 are s repositioned in accordance with its two descendants, Nodes 124 and 125, representing the second level attributes ADDRESS and NAME of table SQL3, respectively.

Figure 1G:
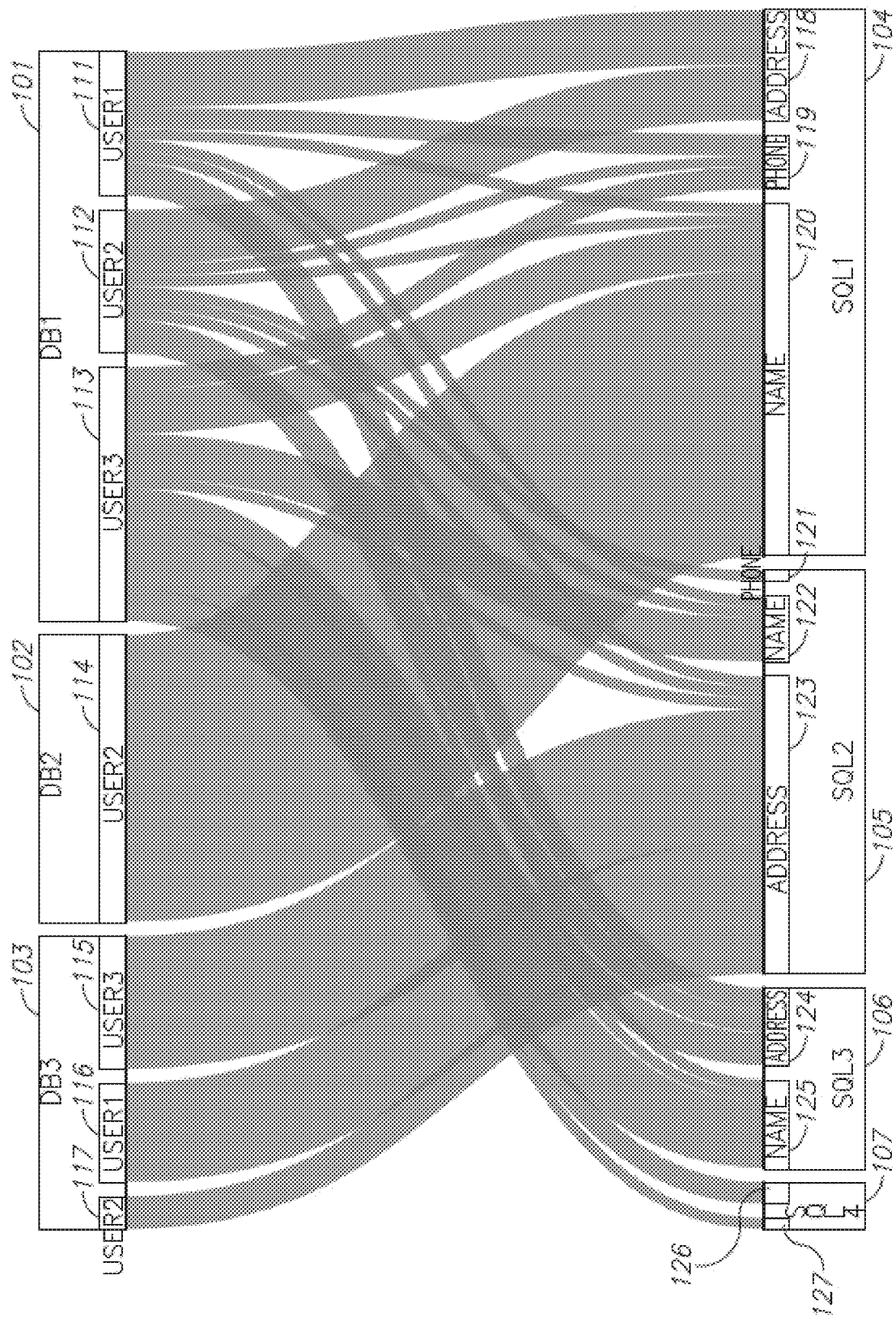

FIG. 1G shows a sixth layout modification in which links of Node 107 are modified in accordance with the positions assigned to the descendant Nodes 126 and 127, representing two second level attributes of table SQL4, e.g. NAME and PHONE, respectively (not shown).

It will be appreciated that while in FIGS. 1A-1G and throughout the present disclosure, the layout modification is depicted from top-down with respect to the hierarchy defined over the attributes of the linked objects, the disclosed subject matter is not meant to be limited in this manner, and may be carried out also in a bottom-up approach wherein links of descendent nodes may be overridden by a relative position of a parent node, as may be readily apparent to a person skilled in the art. It will further be appreciated that while FIGS. 1A-1G illustrate hierarchies of two levels each, the disclosed subject matter is not meant to be so limited, and may be utilized for visualizing linkage data of objects with any arbitrary number of hierarchy levels.

Figure 2:
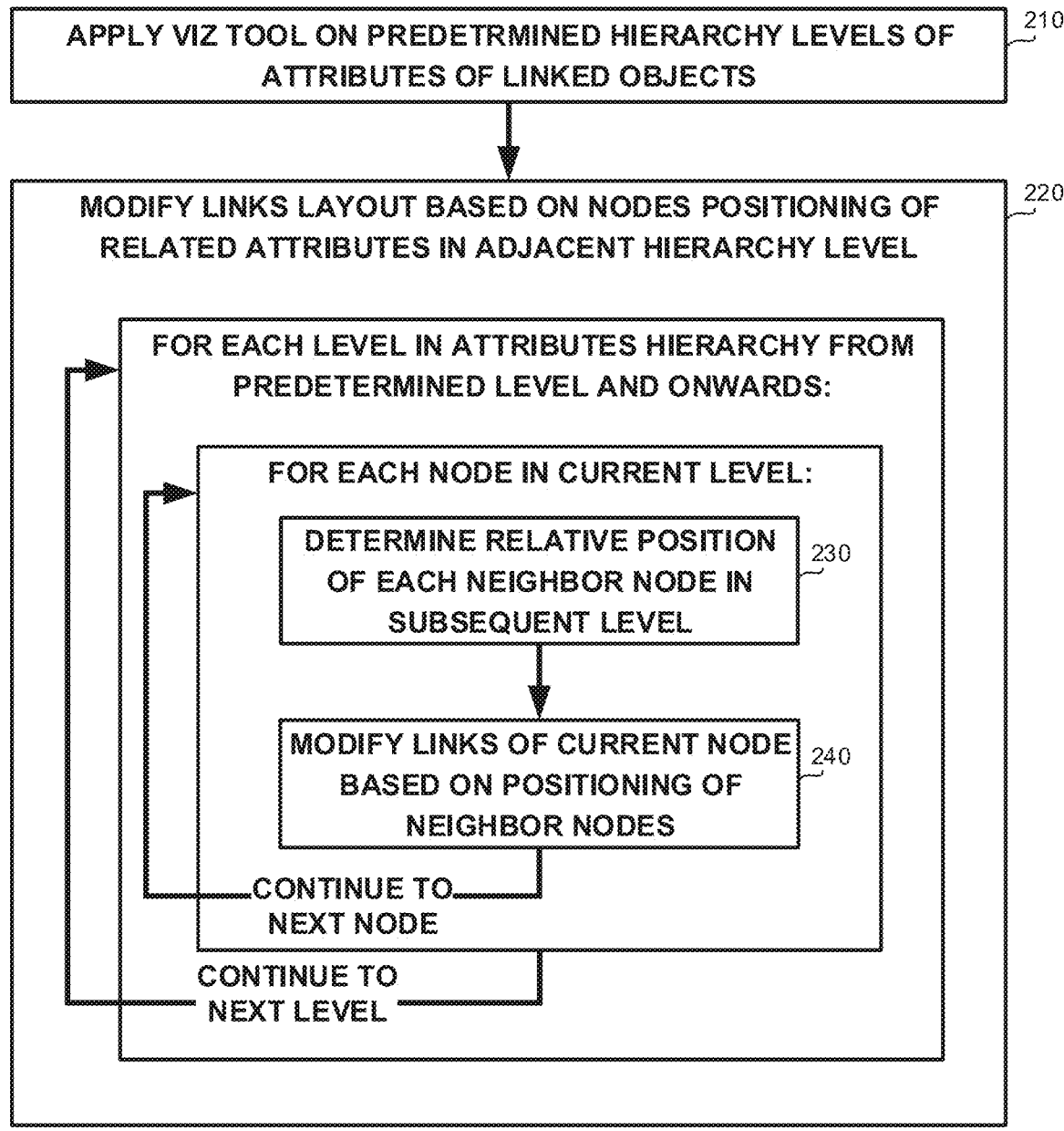
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a visualization tool may be applied on predetermined hierarchy levels of attributes of linked objects. The linked objects may be categorized into two sets of source objects and target objects. A hierarchy relation may be defined over attributes of either the set of source objects, the set of target objects, or both. In some exemplary embodiments, the visualization tool may be applied on the top-level attributes of each of the source and target objects respectively. The visualization tool may be configured to determine a relative position of each node representing an attribute, in a manner optimizing a spatial layout of links connecting between respective pairs of nodes. The optimization may include, for example, minimizing a length of each of the plurality of visualized links, minimizing a number of crossings between links, and the like. In some exemplary embodiments, the visualization tool may be configured to render the sets of nodes representing the source and target objects along parallel axes, such as exemplified in FIGS. 1A-1G. In some further exemplary embodiments, the visualization tool may be configured to render each one of the links with a width indicative of an amount transferred between the two nodes it connects. The visualization tool may be a Sankey diagram plotting tool or the like.

On Step 220, a spatial layout of links being connected to a node may be modified, for at least one node or a group of nodes. The modification may be based on a positioning of nodes representing related attributes in an adjacent hierarchy level, such as, for example, one or more descendant nodes of the node in question, a parent node of the group of nodes, or the like. In some exemplary embodiments, the related attributes may be attributes of one or more objects sharing an attribute in common, which attribute being represented by a node which links are being modified. For example, the node may represent an attribute in the top-most level of the hierarchy, shared by a group of objects, and the related attributes may be attributes in the subsequent hierarchy level, each of which belonging to a different object or sub-group of objects. The positioning of nodes representing the related attributes in the adjacent hierarchy level may be determined by applying the visualization tool with respect to the group of objects and the related attributes only, such that a relative position assigned by the visualization tool to nodes in the predetermined level may not be effected when rendering nodes of any one of the subsequent hierarchy levels, as exemplified in FIGS. 1A-1G.

On Step 230, a relative position of each neighbor node in a subsequent level may be determined. A neighbor node may be a descendant node of a node in a current level, a parent node thereof, or the like. In some exemplary embodiments, the relative position of each neighbor node may be determined by applying the visualization tool in restriction to the set of neighboring nodes.

On Step 240, links connected to a current node may be modified based on a relative position determined on Step 230 for each neighbor node in the subsequent level.

In some exemplary embodiments, Steps 230 to 240 may be performed iteratively for each of the nodes in the predetermined level, until all neighboring nodes in the subsequent level have been traversed. Additionally or alternatively, Steps 230 to 240 may be repeated for each level in the hierarchy of attributes, from the predetermined level and onwards. In some exemplary embodiments, Steps 230 to 240 may be performed as a single step by the visualization tool, wherein the visualization tool may be applied in restriction to neighboring nodes in an adjacent level.

Figure 3:
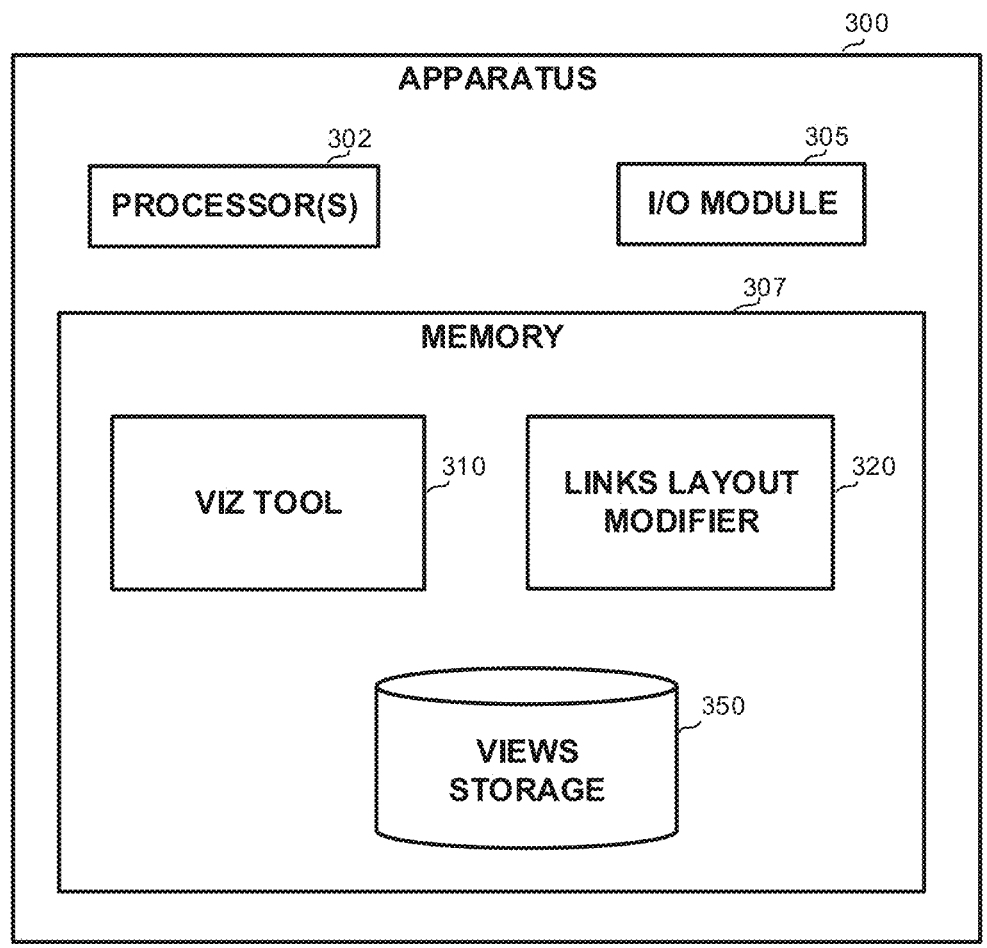
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, such as, for example, receiving linkage data, receiving user commands to display certain views or attribute levels, receiving user commands to navigate up or down through one hierarchy or another, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

Visualization (Viz) Tool 310 may be configured to render a visualization of linkage data, describing relations between two sets of entities, wherein either one or both of the sets may be associated with a hierarchical structure. Viz Tool 310 may be configured to be applied on the linkage data with respect to a predetermined hierarchy level of each of the sets of linked objects, similarly as in Step 210 of FIG. 2 and as depicted in FIGS. 1A-1G. Viz Tool 310 may be configured to render the linkage data in a form of a bipartite graph which nodes thereof represent attributes of the linked objects and links thereof represent connections between represented objects. In some exemplary embodiments, Viz Tool 310 may be configured to determine a relative position of nodes of the graph such that a spatial layout of the links may be optimized, similarly as in Step 230 of FIG. 2 and as depicted in FIGS. 1A-1G.

Links Layout Modifier 320 may be configured to modify a spatial layout of links connected to a node in a visualization of hierarchical objects linkage data, similarly as in Step 220 of FIG. 2 and as depicted in FIGS. 1A-1G. Links Layout Modifier 320 may be configured to perform the modification based on a relative position of nodes representing attributes in an adjacent hierarchy level, which attributes belonging to a subset of one or more objects that share in common an attribute represented by the node which links thereof are being modified, similarly as in Step 240 of FIG. 2 and as depicted in FIGS. 1A-1G. In some exemplary embodiments, Links Layout Modifier 320 may be configured to determine positioning of neighboring nodes in the adjacent level, and modification of links based thereon, by means of applying Viz Tool 310 with respect to related attributes, in accordance with a hierarchical structure of the attributes of the visualized objects. Links Layout Modifier 320 may be configured to apply Viz Tool 310 in restriction to descendant nodes of the node which links thereof are being modified, similarly as depicted in FIGS. 1A-1G.

Views Storage 350 may be configured for storing and fast-retrieval upon user demand of a plurality of views at varying extent of detail. The plurality of views may be generated for each hierarchy level and/or for each node in a given level and a corresponding spatial layout modification of links connecting thereto. Each of the successive views may be selectively and reversibly generated responsive to user demand so as to allow examination of the visualized linkage data in a drill-down fashion. In some exemplary embodiments, a plurality of views conforming to different and/or subsequent layout modifications, such as depicted in FIGS. 1A-1G, may be generated in advance and fetched from Views Storage 350 for display per user demand, e.g. upon interaction of the user with a particular node or group of nodes, upon interaction with a particular level, or the like.

EMBODIMENTS

A. Cyber Security

The disclosed subject matter may be utilized for real-life applications of information security analytics, wherein user activity logs are recorded, aggregated and visualized to allow detection of anomalous or malicious behavior, specifically towards information resources of an organization, such as database systems or the like. One great challenge of cyber security management may be dealing with threats that come from those who operate within the organization. Security analysts require sophisticated tools that allow them to explore and identify user activity that could indicate a real risk to the organization.

Databases are organized collections of data. A database system, such as a Database Management System (DBMS) is a computer program application that interacts with a database, users, and other computer program applications to capture and analyze data. Functionality of database systems varies from system to system and may be broadly divided into two parts, the front end (client level) and the back end (server level). The interface between the front end and the back end may be through Structured Query Language (SQL) or application programs. Some of the transaction processing systems provide transactional remote procedural call interface that connects clients with servers.

Many approaches to detection of insider threat are based on mining SQL queries stored in database audit log files. The systems logs may include emails, database logs, file access, IP addresses, users' name or personal or telephone records, etc. The result of the mining process may be used to form profiles that can model normal database access behavior and identify intruders. Those profiles of roles and users may be the basis for an anomaly detection (AD) system. A user request that does not conform to the normal access profiles may be characterized as anomalous. Two main categories for anomaly attributes have been identified in the art. The first category, referred to as contextual category, includes all attributes describing the context of the anomalous request such as user, role, source, and time. The second category, referred to as structural category, includes all attributes conveying information about the structure of the anomalous request such as SQL command, and accessed database objects. From a technical viewpoint, the detection of insider threat may rely on the collection of accurate logs that detail what activities have been performed, on what those activities were performed, at what time, and by whom. There may be some activities that are logged for all employees. Each activity log may record the timestamp, the user ID, the activity performed, the device it was performed on, and any other additional attributes of interest.

Finding malicious activities is one of the most common, and yet also one of the most unexpected, tasks in information security management. Not only is it hard to detect such activity, but also most chances are that it may be something that has not been seen before. By definition, anomalies are patterns in data that do not conform to a well-defined notion of normal behavior, thus an anomalous behavior is hard to predict and characterize. Being able to visualize anomalies or intrusions both from the inside and the outside may be the key for success in mitigating security risks.

One more severe threat that cyber security has in general, and more over anomaly detection in particular, is an insider threat detection. It is more difficult than many other anomaly detection problems not only because insiders may be knowledgeable about an organization's computer systems and procedures, and further may be authorized to use these systems, but also, and more importantly, because malicious activity by insiders may be a small but critical portion of their overall activity on such systems.

One key challenge of automated tools for detection of insider threat is the problem of classifying an activity as malicious or benign. For this task, anomaly detection tools may often be deployed, in view of a premise that malicious behavior may be manifested as being anomalous in comparison with a user's normal behavior. Thus, an anomaly detection algorithm may classify particular behaviors as anomalies, because according to what the algorithm understands as normal, these activities are different. A need may arise then for an effective integration between automated detection routines that can help reduce a workload of a human analyst, along with the provision of powerful exploratory tools that can provide support and assistance to the human analyst in conducting insider threat investigations.

Detecting the presence of an insider threat may be described as belonging to one of three types of anomaly, as follows:

1) New observations—has the user performed a new activity, is the activity new for this user? Is it also new for this role?
2) Time of the observation—has the user performed an activity/attribute at a different time of day compared to their usual behavior? How long has the observation taken place?
3) Frequency of the observation—has the user performed an activity more frequently compared to their usual behavior? How does any of the above compare against other users in the same role?

The disclosed subject matter may be utilized for the purpose of combining anomaly detection techniques with a visual analytics interface, in order to provide and support exploration of both the detection results and of the corresponding user and role activity. Automated alerting tools based on machine learning alone are known to generate false positives, and perhaps more concerning, false negatives. By coupling these techniques with a visual analytics tool, their usefulness becomes significantly improved.

The disclosed subject matter may be utilized in conjunction with a data security system, such as the IBM Security® Guardium® data security system available from International Business Machines Corporation of Armonk, N.Y. The Guardium system comprises a visualization tool referred to as "Data In-Sight", which enables the user to profoundly examine a sequence of events that are captured by the Guardium system. It provides a comprehensive picture of activity in a specific time window, and helps to detect unusual behaviors. Data In-Sight introduces a revolutionary paradigm that uses human visual capabilities to gain an overall view on data transactions and identify unexpected behaviors. Also, it allows use of the flexibility of human vision perception to spot associations and movements in the raw data that do not fit a pattern of known attacks, and thus may otherwise go unnoticed. The tool allows to present various aspects of the data in a complex visual scenario, and provides the observer with tools to directly explore large amounts of complex data.

Data In-Sight may be utilized to convert audited data to a 3-D chronological visualization of data flow, from sources to destinations, showing data transactions unfold exactly as they occurred. The visualization space may contain two planes, each representing entities of the audit domain of a specific type. Every entry in the audit data may be represented as a moving 'flash line' from an object of the upper plane (for example, client IPs) to an object of the lower plane (for example, databases). The flash line between the source and the destination may delineate a trail (a dotted line) indicating the presence of interaction between the specific source and destination, which may gradually fade into the background. The flash line may have the same color as the destination database. The trails may form an overview of the interaction between sources and destinations in a selected time period. The sources may be located near their destinations, and near other similar sources. The size of the destination entity may be proportional to the volume of transactions relative to the other destination entities. Various ways of modifying the display may be provided, including: color-coding the top entity (color changes as data source details change), filtering from the Data In-Sight chart, investigating of dashboard facets, and the like.

The input data to be visualized may use aggregation on an hourly basis of data collected by the Guardium system, which may be installed in site, e.g. in an organization being protected against insider attacks. The data may be stored in files where each row may stand for an access entry. Each entry may contain information about an access to a data source performed by a user. The information may include parameters describing the access performed, such as who made the access (OS user, DB user, client IP), the target of the action (server, database), the action itself (SQL verbs, objects, tables), and the time it took place. Each entry may contain the details of the access and a count of the times it occurred within a given hour. Each entry may aggregate all the accesses which share the fields specified but may differ on specific details (such as parameters of the SQL statement). Table 1 presents illustrative examples of attributes that may be associated with the four main questions reflected in the visualization, as follows: Who did? What did they do? On What? and When?

TABLE 1

| Attribute | Explanation | Attribute Type |
|---|---|---|
| INSTANCE_ID | Identifies a command under specific parameters (user, IP, source program . . . ) within a specific time frame. | Categorical |
| SESSION_ID | Identifies a period from a user login until a time of log out. | Categorical |
| CONSTRUCT_ID | Identifies command of SQL without free parameters. | Categorical |
| COUNT | Number of accesses with same parameters (user, IP, source program . . . ) within a specific time. | Ordinal |
| COUNT_FAILED | Number of failed accesses with same parameters (user, IP, source program . . . ) within a specific time. | Ordinal |
| OBJECT_VERB | Contains a reference to a pair of verbs and objects. Specifies the action performed, and the object (the table that belongs to the action) | Categorical |
| PERIOD_START | Date and time of start of accesses (in a range of an hour) | Categorical-Time |
| DB_USER | Username connected to the DB | Categorical |
| OS_USER | Username for operating system (username for mac\Linux\Windows) | Categorical |
| SOURCE_PROGRAM | Source (software\application) of the commands | Categorical |
| SERVER_IP | Server IP address | Categorical |
| CLIENT_IP | Client IP address | Categorical |
| SERVICE_NAME | DB name | Categorical |
| CLIENT_HOSTNAME | Machine name | Categorical |

B. Medical Treatment

The disclosed subject matter may be utilized in a medical setting for visualizing data in patients' records in order to detect abnormalities, such as patients from certain cohorts who are being administered with diversified treatments instead of a uniform one. This type of situations may preferably be avoided, in order to reduce risks of complications or adverse effects and to lower healthcare costs. It will be appreciated that drugs may be associated with a hierarchical structure of attributes, such as, for example: a brand name; a generic name; a dosage; and the like. Similarly, medical procedures may be hierarchically coded using the ICD-10 codes of the World Health Organization (WHO). Patients may be assigned with a hierarchical structure using clustering and/or attributes such as: age group; gender; ethnicity; co-morbidities; and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The s network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
rendering a visualization of linkage data by applying a visualization tool to the linkage data, the linkage data comprising a plurality of connections between a plurality of objects, wherein an object at a first endpoint of a connection is a source object and an object at a second endpoint of the connection is a target object, whereby a set of source objects and a set of target objects are defined,
wherein the visualization tool is configured for rendering linkage data as a bipartite graph, wherein the bipartite graph comprises links representing the plurality of connections between the plurality of objects, wherein the bipartite graph comprises nodes representing attributes of the plurality of objects, wherein the visualization tool is configured for ordering the nodes with a minimal number of crossings between the links and a minimal length of each link, thereby optimizing an aspect of a spatial layout of the links of the graph representing the plurality of connections,
wherein a node representing objects in the set of source objects or in the set of target objects associated with a set of attributes of the objects having a hierarchical ordering from a top-most level to a bottom-most level, wherein the visualization is rendered by applying the visualization tool with respect to a first level of the set of attributes associated with the node; and for the node in the visualization and at least one descendant node thereof associated with a subset of one or more objects sharing in common an attribute represented by the at least one descendant node of the node, modifying a link from the spatial layout of links that is connected to the node based on an order assigned to descendant nodes representing a second level of the set of attributes, wherein the order comprises relative positions of the descendant nodes relative to each other, wherein the second level consists of an adjacent level of the first level, wherein said modifying is performed by the visualization tool when applied with respect to the at least one descendant node in the second level, wherein said modifying comprises splitting the link connected to the node into a plurality of links, wherein at least one link of the plurality of links is connected to the at least one descendant node, respectively.

2. The computer-implemented method of claim 1, wherein the nodes by which the attributes are represented are rendered along parallel axes, wherein each level of the hierarchical ordering is assigned a single axis.

3. The computer-implemented method of claim 1, wherein each link from the spatial layout of links is rendered with a width indicative of an amount transferred between nodes connected thereby.

4. The computer-implemented method of claim 1, wherein the hierarchical ordering of the set of attributes is arranged in a tree-like structure, and wherein said modifying is performed iteratively by traversing the tree-like structure from a root node downwards to descendant nodes until all leaf nodes are reached, wherein all links of a traversed node are modified based on the relative positions assigned to descendant nodes of the traversed node by the visualization tool when being applied with respect to the descendant nodes.

5. The computer-implemented method of claim 1, wherein the visualization tool is a Sankey diagram plotting tool.

6. The computer-implemented method of claim 1, wherein said modifying is performed selectively and reversibly in response to user demand, whereby allowing the user to examine the linkage data in a drill-down fashion.

7. The computer-implemented method of claim 1, wherein said modifying is performed for one or more respective nodes with a common attribute in the first level and/or for one or more successive levels, wherein results of said modifying are stored in a designated storage means for fast-retrieval upon user demand.

8. A computerized apparatus having a processor and coupled memory, the processor being adapted to perform the steps of:

rendering a visualization of linkage data by applying a visualization tool to the linkage data, the linkage data comprising a plurality of connections between a plurality of objects, wherein an object at a first endpoint of a connection is a source object and an object at a second endpoint of the connection is a target object, whereby a set of source objects and a set of target objects are defined, wherein the visualization tool is configured for rendering linkage data as a bipartite graph, wherein the bipartite graph comprises links representing the plurality of connections between the plurality of objects, wherein the bipartite graph comprises nodes representing attributes of the plurality of objects, wherein the visualization tool is configured for ordering the nodes with a minimal number of crossings between the links and a minimal length of each link, thereby optimizing an aspect of a spatial layout of the links of the graph representing the plurality of connections, wherein a node representing objects in the set of source objects or in the set of target objects is associated with a set of attributes of the objects having a hierarchical ordering from a top-most level to a bottom-most level, wherein the visualization is rendered by applying the visualization tool with respect to a first level of the set of attributes associated with the node; and for the node in the visualization and at least one descendant node thereof associated with a subset of one or more objects sharing in common an attribute represented by the at least one descendant node of the node, modifying a link from the spatial layout of links that is connected to the node based on an order assigned to descendant nodes representing a second level of the set of attributes, wherein the order comprises relative positions of the descendant nodes relative to each other, wherein the second level consists of an adjacent level of the first level, wherein said modifying is performed by the visualization tool when applied with respect to the at least one descendant node in the second level, wherein said modifying comprises splitting the link connected to the node into a plurality of links, wherein at least one link of the plurality of links is connected to the at least one descendant node, respectively.

9. The computerized apparatus of claim 8, wherein the nodes by which the attributes are represented are rendered along parallel axes, wherein each level of the hierarchical ordering is assigned a single axis.

10. The computerized apparatus of claim 8, wherein each link from the spatial layout of links is rendered with a width indicative of an amount transferred between nodes connected thereby.

11. The computerized apparatus of claim 8, wherein the hierarchical ordering of the set of attributes is arranged in a tree-like structure, and wherein said modifying is performed iteratively by traversing the tree-like structure from a root node downwards to descendant nodes until all leaf nodes are reached, wherein all links of a traversed node are modified based on the relative positions assigned to descendant nodes of the traversed node by the visualization tool when being applied with respect to the descendant nodes.

12. The computerized apparatus of claim 8, wherein the processor being adapted to perform said modifying selectively and reversibly in response to user demand, whereby allowing the user to examine the linkage data in a drill-down fashion.

13. The computerized apparatus of claim 8, wherein the processor being adapted to perform said modifying for one or more respective nodes with a common attribute in the first level and/or for one or more successive levels, wherein results of said modifying are stored in a designated storage means for fast-retrieval upon user demand.

14. A computer program product comprising a non-transitory computer readable storage medium retaining program instructions, which program instructions when read by a processor, cause the processor to perform a method comprising:

rendering a visualization of linkage data by applying a visualization tool to the linkage data, the linkage data comprising a plurality of connections between a plurality of objects, wherein an object at a first endpoint of a connection is a source object and an object at a second endpoint of the connection is a target object, whereby a set of source objects and a set of target objects are defined, wherein the visualization tool is configured for rendering linkage data as a bipartite graph, wherein the bipartite graph comprises links representing the plurality of connections between the plurality of objects, wherein the bipartite graph comprises nodes representing attributes of the plurality of objects, wherein the visualization tool is configured for ordering the nodes with a minimal number of crossings between the links and a minimal length of each link, thereby optimizing an aspect of a spatial layout of the links of the graph representing the plurality of connections, wherein a node representing objects in the set of source objects or in the set of target objects is associated with a set of attributes of the objects having a hierarchical ordering from a top-most level to a bottom-most level, wherein the visualization is rendered by applying the visualization tool with respect to a first level of the set of attributes associated with the node; and for the node in the visualization and at least one descendant node thereof associated with a subset of one or more objects sharing in common an attribute represented by the at least one descendant node of the node, modifying a link from the spatial layout of links that is connected to the node based on an order assigned to descendant nodes representing a second level of the set of attributes, wherein the order comprises relative positions of the descendant nodes relative to each other, wherein the second level consists of an adjacent level of the first level, wherein said modifying is performed by the visualization tool when applied with respect to the at least one descendant node in the second level, wherein said modifying comprises splitting the link connected to the node into a plurality of links, wherein at least one link of the plurality of links is connected to the at least one descendant node, respectively.

15. The computer program product of claim 14, wherein nodes by which the attributes are represented are rendered along parallel axes, wherein each level of the hierarchical ordering is assigned a single axis.

16. The computer program product of claim 14, wherein each link from the spatial layout of links is rendered with a width indicative of an amount transferred between nodes connected thereby.

17. The computer program product of claim 14, wherein the hierarchical ordering of the set of attributes is arranged in a tree-like structure, and wherein said modifying is performed iteratively by traversing the tree-like structure from a root node downwards to descendant nodes until all leaf nodes are reached, wherein all links of a traversed node are modified based on the relative positions assigned to descendant nodes of the traversed node by the visualization tool when being applied with respect to the descendant nodes.

18. The computer program product of claim 14, wherein the program instructions cause the processor to perform said modifying selectively and reversibly in response to user demand, whereby allowing the user to examine the linkage data in a drill-down fashion.

19. The computer program product of claim 14, wherein the program instructions cause the processor to perform said modifying for one or more respective nodes with a common attribute in the first level and/or for one or more successive levels, wherein results of said modifying are stored in a designated storage means for fast-retrieval upon user demand.

* * * * *